Aug. 21, 1951     C. W. GLENN     2,564,840
FISHING DEVICE
Filed July 27, 1950
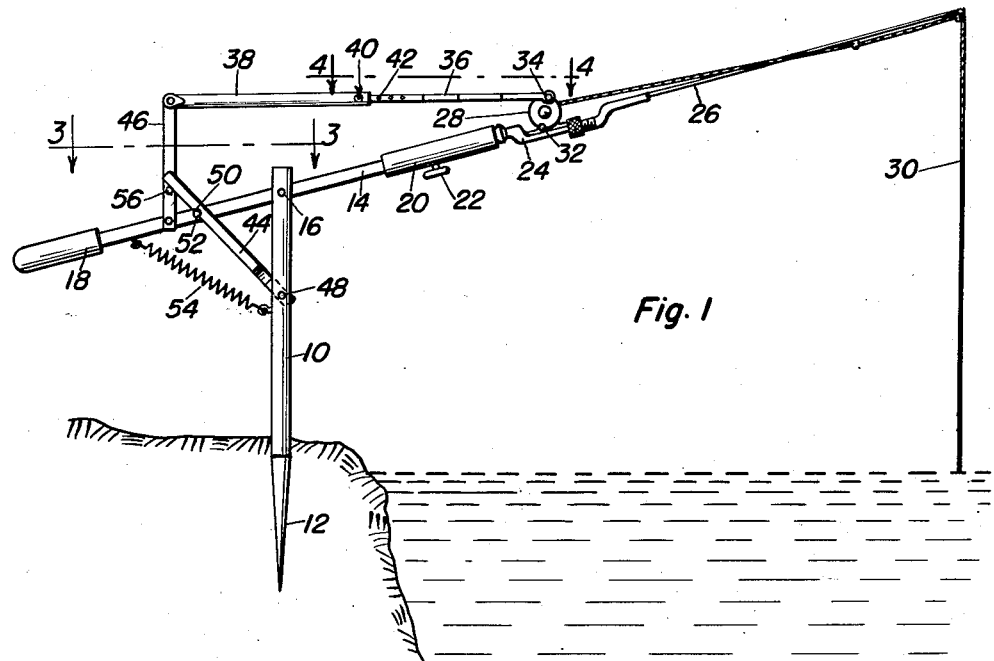
Fig. 1
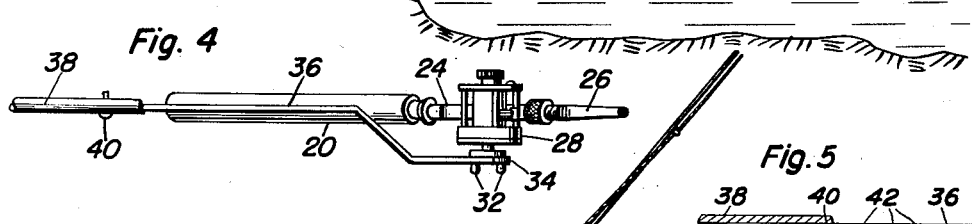
Fig. 4
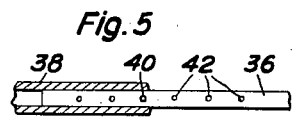
Fig. 5
Fig. 2
Fig. 3
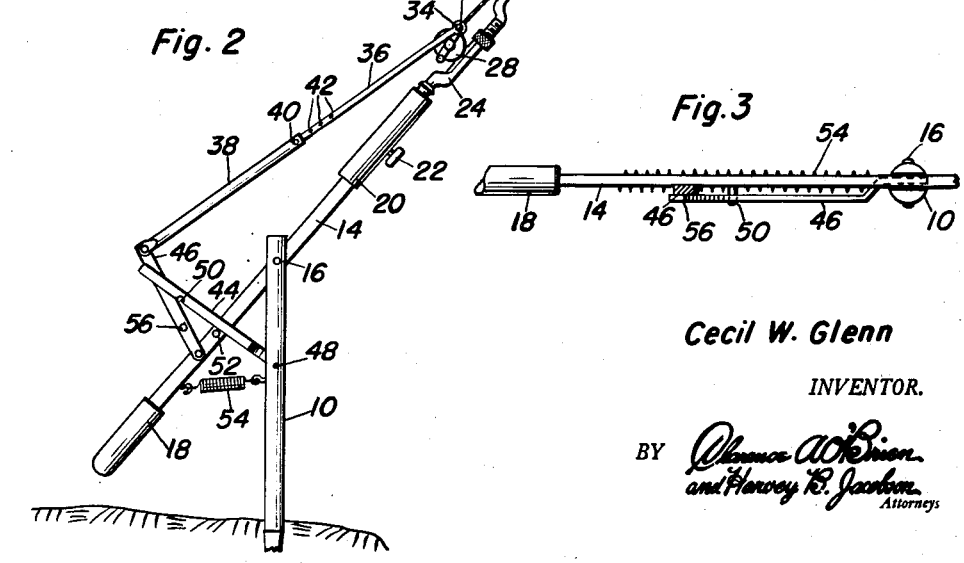
Cecil W. Glenn
INVENTOR.
BY Patented Aug. 21, 1951

2,564,840

UNITED STATES PATENT OFFICE 2,564,840

FISHING DEVICE

Cecil W. Glenn, Kingfisher, Okla.

Application July 27, 1950, Serial No. 176,214

1 Claim. (Cl. 43—16)

This invention relates to fishing devices and more particularly to an automatic fishing device designed to set the hook in the mouth of the fish immediately after the fish strikes the bait.

A primary object of this invention is to provide a device which will operate automatically and mechanically when a fish strikes the bait, thus setting the hook in the fish's mouth more quickly and surely than can be done by hand.

Another object of this invention is to provide a fishing device which can be operated in multiple by a single fisherman, since each line does not require constant attention.

Still another object of this invention is to provide a fishing device of the automatic type which can be adjusted for use with different types of game fish and with different types of reels and bait.

Yet another object of this invention is to provide an automatic fishing device which is light in weight, yet sturdy, and which can be collapsed into a relatively small space.

A last object to be mentioned specifically is to provide a device of this character which is relatively inexpensive and practicable to manufacture, which is simple, safe and convenient to use, and which will give generally efficient and durable service.

With these objects definitely in view, this invention resides in certain novel features of construction, combination and arrangement of elements and portions as will be hereinafter described in detail in the specification, particularly pointed out in the appended claim, and illustrated in the accompanying drawing which forms a material part of this application, and in which:

Figure 1 is a side elevational view of the device as employed in an actual fishing operation;

Figure 2 is a fragmentary view of the same assembly, the parts being shown in a second position, after the fish has struck and the reel has operated the trigger means so that the latch means is released to allow the fishing rod to be jerked up quickly into the position indicated in the figure;

Figure 3 is a fragmentary horizontal sectional view taken substantially upon the line 3—3 in Figure 1;

Figure 4 is a similar horizontal view, in plan, taken on the line 4—4 in Figure 1; and, Figure 5 is a fragmetary view partially in section and elevation on an enlarged scale showing the manner in which certain telescoping parts are adjustably connected by way of a pin and coacting apertures.

Similar characters of reference designate similar or identical elements and portions throughout the specification and throughout the different views in the drawing.

Referring now to the drawing in detail, this invention includes a standard 10 having a sharpened lower point 12 which will be driven into the ground at the shore of a body of water wherein the fishing operation is carried out. A lever 14 is pivoted as indicated at 16 upon the upper end of the standard 10. One end of this lever is provided with a handle 18 and the other end of this lever, on the opposite side of the standard 10, is provided with a sleeve-like holder 20 which is secured to the lever by a set screw 22 and which comprises mounting means for the handle end of the fishing rod reel frame 24, this frame carrying an elongated fishing rod 26 upon its opposite end and a reel 28 is mounted on the frame 24, the particular construction of this reel being unimportant in this specification, except that the reel will ordinarily be provided with a handle or handles 32. The fishing line 30 will, of course, extend from the reel 28 according to conventional practice.

The handle 32, or one of the handles 32 if there are more than one, receives an eye member 34 on the end of one section 36 of a link which is comprised of this section 36 and another telescoping section 38. The sections are adjustably held together with a transverse pin 40 inserted selectively through apertures 42 in the section 36 and apertures in the section 38.

A bar, hereinafter referred to as the first bar 44 is pivoted at one end on the standard 10, as indicated at 48. This first bar has a deformation, ordinarily a notch 50, which receives a pin 52 transversely secured on one end portion of the lever 14. A spring 54 is connected to and between this same one end portion of the lever 14 and the standard 10, the spring being under tension. This spring 54 biases said one end of the lever 14 downwardly, and the first bar 44 and pin 52 hold said one end portion of the lever 14 elevated against the action of the spring 54 in the position indicated in Figure 1, until such time as the fish strikes the bait on the line 30.

Trigger means to trip the first bar 44 includes the link comprised of the links sections 36 and 38 already described and a second bar 46 pivoted to the end of the link section 38 remote from the link section 36 and also pivoted to the said one end portion of the lever 14. The second bar 46 carries a pin 56 which frictionally engages the lower side of the first bar 44, above the pin 52.

The operation of this invention will be clearly understood from a consideration of the foregoing description of the mechanical details thereof, taken in connection with the drawing and with the above recited object. In recapitulation, when the fish strikes the bait on the line 30, the pull on the line 30 causes the reel 28 to rotate sufficiently so that the handle 32 concerned pulls the link sections 36 and 38, as to the right in Figure 1, causing the second bar 46 to move so that the pin 56 pushes the first bar 44 as to the right from the position indicated in Figure 1, and so that the pin 52 is released from the notch 50. The spring 54 then pulls the said one end of the member 14 downwardly and the fishing rod 26 is jerked quickly upwardly by the action of the spring 54. The element of the device will then be in the position indicated in Figure 2. The fisherman, noticing that he has a strike on this particular line, can then release the eye 34 from the handle 32 and reel in the fish, and after the fish has been removed, the re-baiting of the line and the setting of the device in the position indicated in Figure 1 will prepare for the next catch. Further description would appear to be unnecessary, and it is pointed out that minor modifications of the disclosed embodiment may be resorted to within the scope of the appended claim, all without departure from the spirit of this invention.

Having described the invention, what is claimed as new is:

A fishing device comprising a support, a lever pivotally mounted on said support for movement about a horizontal axis, a spring secured under tension to and between one end portion of the lever and said support and biasing said one end portion downwardly, a fishing rod secured to the other end portion of the lever and having a reel with a handle mounted thereon, latch means to hold said one end portion in elevated position against the action of said spring, reel operated trigger means to release said latch means, said latch means comprising a bar pivoted on said support and having a notch formed therein, an element on said lever engaging said notch, said trigger means comprising a second bar having one end pivotally connected to said lever, and an inflexible link pivotally connected to and between the other end of said second bar and said handle of the reel, said second bar having an element for frictionally engaging said first mentioned bar in such a manner as to cause said first mentioned bar to move about its pivotal axis and release the first mentioned element from said deformation.

CECIL W. GLENN.

REFERENCES CITED

The following references are of record in the file of this patent:

UNITED STATES PATENTS

| Number | Name | Date |
|---|---|---|
| 1,549,405 | Bjurstrom | Aug. 11, 1925 |
| 1,957,853 | Sibley | May 8, 1934 |
| 2,482,999 | Bean | Sept. 27, 1949 |